Aug. 25, 1931.   G. C. FARMER   1,820,129
SOUND PRODUCER
Filed May 16, 1930
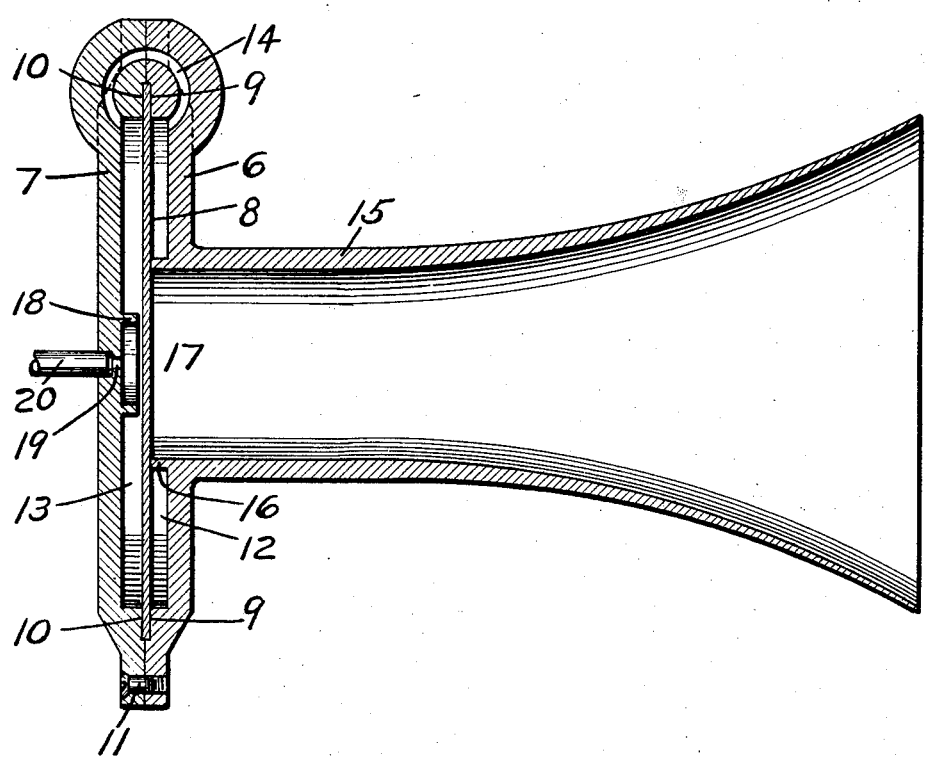
INVENTOR
GEORGE C. FARMER
BY *Wm. N. Cady*
ATTORNEY Patented Aug. 25, 1931

1,820,129

UNITED STATES PATENT OFFICE

GEORGE C. FARMER, OF CHICAGO, ILLINOIS, ASSIGNOR TO THE WESTINGHOUSE AIR BRAKE COMPANY, OF WILMERDING, PENNSYLVANIA, A CORPORATION OF PENNSYLVANIA

SOUND PRODUCER

Application filed May 16, 1930. Serial No. 452,854.

This invention relates to sound producing devices, and more particularly to the type employing a vibratory diaphragm.

An object of the invention is to provide an improved sound producer of the above type which is adapted to be operated by a partial vacuum.

Another object of the invention is to provide a sound producer of the above type having a chamber adapted to be connected to a source of partial vacuum and a chamber adapted to be connected to the atmosphere, both chambers communicating with each other, and a flexible diaphragm separating the chambers, and adapted in one position to cut off the communication to the atmosphere and in another position to cut off the source of partial vacuum.

Another object of the invention is to provide an improved sound producer of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a vertical longitudinal section of a sound producing device embodying the invention.

Referring to the drawing, the device may comprise casing sections 6 and 7, between which is clamped a flexible diaphragm 8. The casing section 6 has an annular recess 9, and the casing section 7 has a similarly formed recess 10. When the parts are assembled, the recesses are adapted to receive the marginal edge of the diaphragm 8, the casing sections being secured together by means of screws 11, only one of which is shown.

The interior of each casing section is so formed that a chamber 12 is provided on the side of the diaphragm 8 facing the casing section 6, and a chamber 13 is provided on the side of the diaphragm facing the casing section 7. These chambers are connected by a passage 14.

The casing section 6 is provided with a suitable horn 15 which projects outwardly therefrom. An annular rib or bead 16 is formed on the inner wall of the casing section 6 concentrically with the horn opening. The rib 16 projects from the inner wall of the casing section 6 a suitable distance, so as to be engaged by the face of the diaphragm 8, the construction being such that the diaphragm seats against the rib 16 and cuts off the communication from the chamber 12 to the atmosphere through the opening 17 in the casing provided by the horn 15. As shown, the interior diameter of the rib 16 is coextensive with the diameter of the horn opening 17.

An annular rib or bead 18 is formed on the inner wall of the casing section 17. The rib 18 is disposed concentrically with respect to the rib 16, and the diameter of the rib 18 is less than the diameter of the rib 16. The rib 18 terminates short of the diaphragm 8, so that when the diaphragm is seated against the rib 16, the opposite face of the diaphragm will be spaced from the rib 18.

An opening 19 is formed in the wall of the casing section 7 concentrically of the rib 18, and a pipe 20, leading from a suitable source of partial vacuum, such as a reservoir or the intake manifold of an internal combustion engine, is connected to said opening.

In operation, when it is desired to produce sound, a source of partial vacuum (not shown) is connected through the pipe 20 with the chamber 13, and the atmospheric pressure acting on the portion of the diaphragm 8 within the seat provided by the rib 16, moves the diaphragm away from the rib 16, against the partial vacuum in chamber 13. This action seats the diaphragm 8 against the rib 18, thereby cutting off the communication from the chamber 13 to the source of partial vacuum. With the source of partial vacuum thus cut off and chamber 12 connected to the atmosphere through the opening 17, a sudden flow of air will be supplied to chamber 13, through the passage 14. This causes the quick build up of pressure in chamber 13, so that the diaphragm 8, which is now flexed out of its normal position, moves back to its original position, aided by the spring action of the diaphragm. When the diaphragm seats against the rib 16, a partial vacuum is again created in the chambers 12 and 13, so that the diaphragm again moves away from the rib 16 in the manner previously described.

The diaphragm is thus caused to vibrate and thereby produce a sound which is amplified by the horn 15.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a sound producer, the combination with a chamber connected to a source of partial vacuum, a chamber adapted to be connected to the atmosphere, and a passage connecting both chambers, of a flexible diaphragm separating the chambers and adapted in one position to cut off the communication to the atmosphere and in another position to cut off the source of partial vacuum.

2. A sound producer comprising a flexible diaphragm, chambers on the opposite sides of said diaphragm, one of said chambers having an opening to the atmosphere, the other chamber having an opening leading to a source of partial vacuum, a rib projecting into each chamber and surrounding each opening, the diaphragm being normally seated against the rib in the first mentioned chamber, and a passage connecting said chambers.

3. A sound producer comprising a casing containing a flexible diaphragm, a chamber at one side of said diaphragm and having an opening to a source of vacuum, a rib projecting into said chamber and surrounding said opening, said rib being spaced from the diaphragm, an opening on the opposite side of the diaphragm to the atmosphere, a rib surrounding said atmospheric opening and providing a seat against which the diaphragm normally engages to close the atmospheric opening, and a passage connecting said chamber with said atmospheric opening when the diaphragm is unseated from the rib surrounding said atmospheric opening.

4. A sound producer comprising a casing containing a flexible diaphragm, a chamber at one side of said diaphragm and having an opening to a source of vacuum, a rib projecting into said chamber and surrounding said opening, an opening on the opposite side of the diaphragm to the atmosphere, said atmospheric opening being greater in area than said opening to vacuum, a rib surrounding said atmospheric opening and providing a seat against which the diaphragm normally engages to close the atmospheric opening, the rib in said chamber being spaced from the face of the diaphragm when said diaphragm is seated against the other rib and a passage connecting said chamber with said atmospheric opening when the diaphragm is unseated from the rib surrounding said atmospheric opening.

5. A sound producer comprising a flexible diaphragm having a chamber at one side connected to a source of partial vacuum, a chamber at the opposite side, a horn having an opening adjacent to said chamber at the opposite side, a rib formed at said horn opening against which the diaphragm normally seats to cut off communication between the atmosphere and said chamber at the opposite side, a passage connecting said chambers, and a rib extending into the first mentioned chamber.

6. A sound producer comprising a flexible diaphragm having a chamber at one side provided with a rib against which the diaphragm is normally seated, a chamber at the opposite side of the diaphragm adapted to be connected to a source of partial vacuum, a passage connecting said chambers, a rib formed in said chamber at the opposite side, a horn, an opening between the horn and the first mentioned chamber, and an opening within the rib in the partial vacuum chamber.

In testimony whereof I have hereunto set my hand, this 13th day of May, 1930.

GEORGE C. FARMER.